United States Patent Office 2,836,813
Patented May 27, 1958

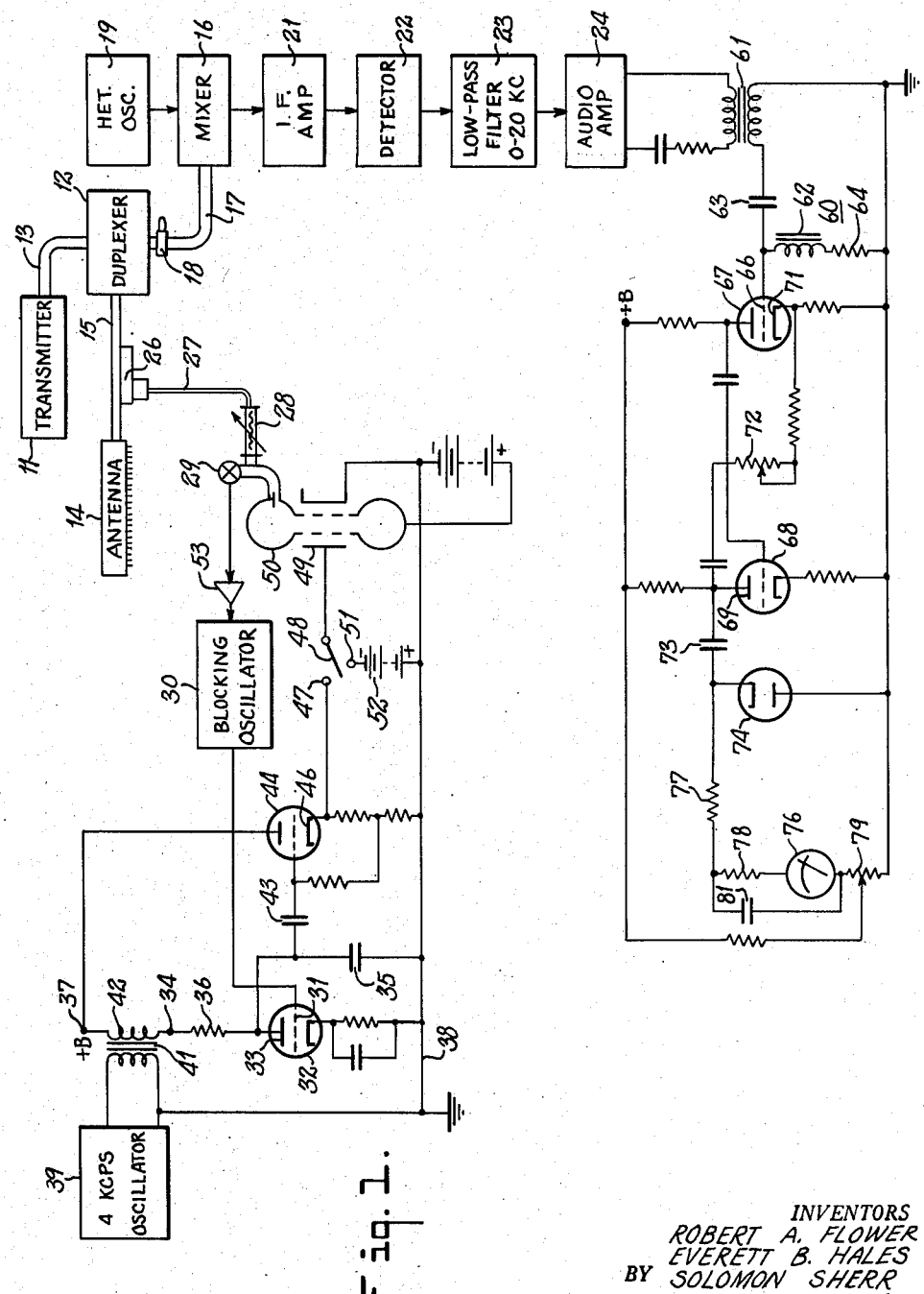

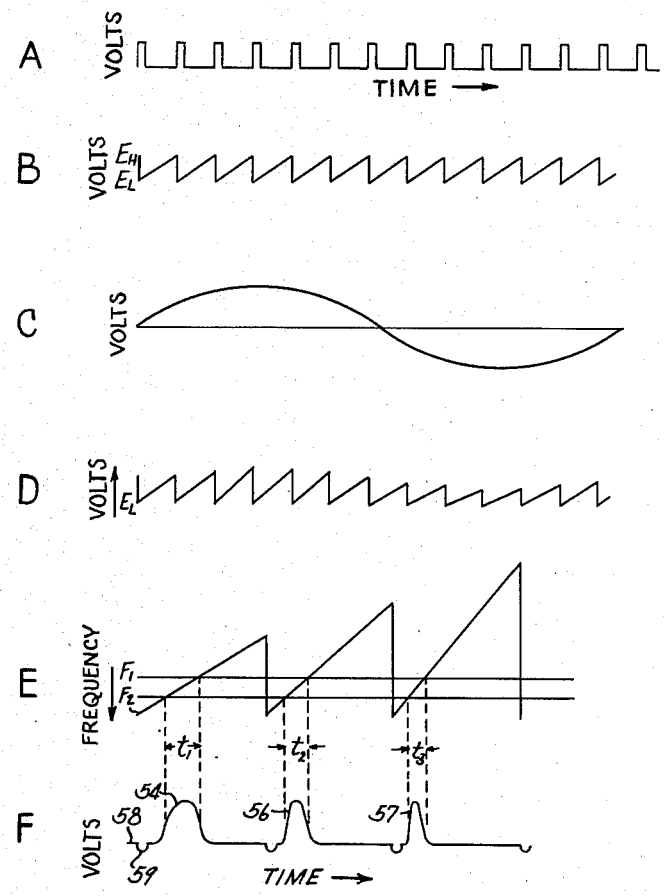

2,836,813

MICROWAVE DOPPLER TEST INSTRUMENT

Robert A. Flower, White Plains, Everett B. Hales, Hawthorne, and Solomon Sherr, Tuckahoe, N. Y., assignors to General Precision Laboratory Incorporated, a corporation of New York Application August 6, 1953, Serial No. 372,754

4 Claims. (Cl. 343—17.7)

This invention relates to instruments for testing pulse microwave Doppler transmitter-receivers and particularly to instruments for applying an overall operation test to the receiver component of such an instrument by applying a microwave test signal containing simulated Doppler information.

In the bench testing of microwave Doppler radio equipment there are no conventional means for overall operation testing, principally because of the lack of any way of artificially generating a microwave signal bearing Doppler information. Tests have heretofore been confined to tests of individual components and so have only indirectly indicated the operability and efficiency of the complete assembly in actual use. No such microwave generator has been developed up to this time because of the difficulty in acceptably simulating the peculiar and complex radio frequency spectrum which in actual use is the result of receiving reflected microwave energy from a moving body consisting of numerous heterogeneous reflectors.

The present invention provides an instrument for bench testing microwave Doppler transmitter-receivers. It is associated with the microwave Doppler radio instrument under test in such manner as to provide a quantitative operation test of the receiving radio frequency, intermediate frequency and audio frequency portions of the instrument. The testing means does this by abstracting a fraction of the pulsed transmitting signal energy from the instrument, employing it to synchronize a simulated Doppler signal of a selected frequency, introducing the resulting signal into the receiver, and measuring the resulting output. The specific quantities thus measured are the signal-to-noise ratio (S/N), and the instrument sensitivity.

The test instrument of the present invention is useful not only for the testing of Doppler radar instruments but is of general application wherever an amplitude modulated microwave pulse train is required for any receiver testing purpose.

The present invention comprises a generator of microwave signals simultaneously modulated at two rates, one modulating voltage having a saw-tooth form and the other a sinusoidal form. The modulated microwave signals are applied to the radio frequency input terminal of the Doppler receiver, and the audio output is measured by a sensitive meter. By the application of appropriate test procedures the desired quantities can be accurately computed from the indicated measurements.

The principal purpose of this invention is to provide a signal generator for producing a simulated microwave echo signal containing Doppler frequencies for the purpose of testing microwave Doppler radio equipment.

A more general purpose of this invention is to provide test equipment for the overall operational bench testing of a microwave Doppler transmitter-receiver.

A still more general purpose of this invention is to provide apparatus for simulation of the amplitude modulation of a microwave pulse train for application to a microwave receiver.

Further understanding of this invention may be secured from the detailed description and drawings, in which:

Figure 1 is a combined schematic and block diagram of test equipment embodying this invention and of a transmitter-receiver to be tested.

Figure 2 illustrates some of the wave forms in the test equipment.

Referring now to Fig. 1, a microwave Doppler radio transmitter-receiver includes a microwave transmitter 11, a radar duplexer 12 connected to transmitter 11 by suitable microwave hollow guides 13, a microwave antenna 14 connected to the duplexer by guide 15, and a microwave receiver including a mixer 16. The mixer 16 is connected through a hollow guide 17 and a transmit-receive (TR) switch tube 18 to the radar duplexer 12. The receiver includes, in addition to mixer 16, a local heterodyne oscillator 19, an intermediate frequency amplifier 21, a detector 22, a 1–20 kc. p. s. low-pass filter 23, and an audio amplifier 24. These components are all part of the radio transmitter-receiver and are characteristic of portions of many Doppler radio instruments having various detailed designs, employing various other associated parts not pertinent to this description, and used for various purposes.

One way in which such a transmitter-receiver may operate is as follows. The instrument is installed as part of a so-called Janus system on an airplane. Pulsed microwave energy is transmitted from radar antenna 14 in two lobes, one ahead of the airplane and one toward the rear, but is prevented from reaching the receiver directly by the TR switch 18. Echoes of these two lobes of energy are received by the antenna 14, now having frequencies respectively higher and lower than the transmitted frequency, and are transmitted through guide 15, duplexer 12, and guide 17 to the mixer 16, where they are mixed both with each other and with a local signal from oscillator 19 to form an intermediate frequency signal containing the Doppler difference frequency as modulation. This signal, which may for example have a frequency of 30 mc. p. s. with modulation consisting of a frequency spectrum in the band 1–20 kc. p. s., is applied to the intermediate amplifier 21. The amplified signal is detected by detector 22 which removes the 30 mc. p. s. frequency and emits a signal containing the pulse repetition frequency and the Doppler frequency. The pulse repetition frequency is removed by the low-pass filter 23, and the output is amplified in amplifier 24. This output consists solely of an alternating current at the Doppler spectrum frequencies covering a band of about 10% of the mid-band Doppler frequency.

In order to test the radar transmitter-receiver in the absence of echo signals as, for example, in factory bench testing or in airplane ground testing, the microwave transmitter 11 is placed in operation and a fraction of its pulsed energy after passing through duplexer 12 is abstracted by the directional coupler 26. This abstracted energy is employed merely to secure trigger pulses at the pulse repetition frequency, which may be 50 kc. p. s. Since these trigger pulses must be at the transmitter pulse frequency and phase they are advantageously but not necessarily secured from the transmitter. The pulses are conducted through coaxial cable 27 and an attenuator 28 to a crystal demodulator 29 and from it after amplification in amplifier 53 to a blocking oscillator 30.

The blocking oscillator output pulses having the frequency of 50 kc. p. s. are indicated at A in Fig. 2. These pulses are applied to the control grid 31 of a saw-tooth generator triode 32. This tube is normally biased so as to be nonconductive, so that the anode 33 is at the potential of the anode supply terminal 37 and the condenser 35 between anode 33 and ground is charged to that potential also. Upon application of a pulse, which has a duration of one microsecond, the triode 32 is made conductive and its internal resistance falls to a few thousand ohms. The condenser 35 discharges through tube 32, the time constant being such that the discharge is fairly complete in the pulse time and the potential of the anode 33 falls to about 50 volts. In the 19 microseconds intervening until the next pulse the condenser 35 charges through anode resistor 36 toward the potential of terminal 37 but, because of the long time constant of condenser 35 and resistor 36, charges only to about 8 volts above its 50-volt minimum when the positive supply at terminal 37 is 250 volts. The voltage rise is therefore confined to the initial portion of its exponential curve and is almost ideally linear. At the terminal of the 19 μs. period between pulses the triode 32 is again made conductive and the process is repeated. There is thus generated at the anode 33 a sawtooth potential waveform as indicated in Fig. 2 at B, having a minimum potential $E_L$ of about +50 volts and a maximum potential $E_H$ of about +58 volts relative to the signal ground conductor 38, Fig. 1.

The sawtooth voltage waveform is modulated by the introduction in series with the triode anode 33 of a sinusoidal potential having a frequency in the Doppler band, that is to say between 1 and 20 kc. p. s. For the purpose of illustration a frequency of 4 kc. p. s. is chosen. A sinusoidal wave of this frequency is depicted at C, Fig. 2, drawn to the same time scale as A and B. The 4 kc. p. s. potential is generated in an oscillator 39 and is applied through a transformer 41 having its secondary winding 42 connected in series between the terminal 34 and the positive voltage supply terminal 37. The potential of terminal 34 to which condenser 35 charges then is not constant but varies sinusoidally at the 4 kc. p. s. rate. This similarly varies the voltage which anode 33 attains at the termination of the 19 μs. charging time, so that the graph B of Fig. 2 becomes as shown at D. The discharge potential $E_L$ remains substantially unaffected because of the short time period of condenser 35 associated with the tube resistance.

The modulated sawtooth potential of anode 33 is coupled through condenser 43 to a cathode follower triode 44, from the cathode 46 of which is secured a potential of like form. This potential is applied through contact 47 of switch 48 to the reflector 49 of a klystron 50. The klystron 50 is arranged to oscillate at a microwave frequency which, with a selected reflector potential, is the nominal or average microwave radar frequency. As an aid to adjustment the switch 48 is provided with a contact 51 to which is connected a direct-current source represented by battery 52 having the selected potential.

In a klystron oscillator the output frequency is proportional to the potential applied to the reflector, so that except for polarity of the graph D, if the ordinate scale is changed from volts to microwave frequency, represents the output frequency variation of klystron 50. Such a curve is drawn to a larger scale at E, the abscissae representing time as before.

The microwave energy output of klystron 50 is transmitted through attenuator 28, coaxial cable 27, directional coupler 26, guide 15, duplexer 12, TR tube 18 and guide 17 to mixer 16. Here the modulated signal is mixed with the output of heterodyne oscillator 19 which is at a frequency 30 mc. p. s. removed from the average frequency of oscillation of klystron 50. The mixed output containing the modulated 30 mc. p. s. component is applied to the intermediate frequency amplifier 21 which passes only that component, filtering out the microwave frequencies. The component is detected resulting in the envelope with the 30 mc. p. s. frequency removed. This envelope contains that part of the modulated sawtooth form which has been permitted by the intermediate amplifier filtering action to pass.

This is shown at E, Fig. 2. The intermediate frequency band has limits $f_1$, $f_2$, and is indicated by the horizontal lines so designated. The sawtooth energy in each cycle sweeps across the intermediate frequency pass band producing in the intermediate frequency amplifier an energy pulse having a time width or duration depending upon the slope of the sawtooth. Since the slope varies from cycle to cycle, the resulting intermediate frequency amplifier pulse widths also vary. This is indicated in Fig. 2 at F, in which the intermediate amplifier pulse envelopes 54, 56 and 57 have respective time durations or widths of $t_1$, $t_2$ and $t_3$, because derived as indicated from the intersection in graph E between the sawtooth slopes and the intermediate pass band limit frequencies. The level of line 58 represents the noise level at the output of the intermediate amplifier during intervals between signal pulses, and the negative loops 59 represent the times during the generation by transmitter 11 of the transmitting pulses when the receiver is isolated by action of the TR switch tube 18.

An advantage of applying a frequency-swept signal to the intermediate amplifier is that no critical tuning of the test circuit to the radar transmitter-receiver is required, it merely being necessary to sweep through the receiver band as indicated in Fig. 2E.

The output of intermediate amplifier 21 having the 50 kc. p. s. pulse envelope form shown at F, Fig. 2, is demodulated in detector 22 and the output containing no 30 mc. p. s. frequency is applied to the low-pass filter 23. Such a filter, when operating on width-modulated pulses such as these, removes the frequencies above cut-off, in this case removing the 50 kc. p. s. frequency which is higher than the 20 kc. p. s. cut-off, and passes the frequency of width modulation, which is here 4 kc. p. s. Such a filter comprises shunt capacitance and therefore has an integrating effect. The shunt capacitance is charged by each input pulse with a quantity of electric charge which is a function of the input voltage and the pulse time duration. Since all pulses are at the same voltage the condenser charges vary in accordance with the varying pulse widths. But, in accordance with the relation $V=Q/C$, condenser potential V is proportional to charge, Q, therefore the filter output potential varies in accordance with the widths of the pulses. In other words, the low-pass filter transforms pulse width modulation into amplitude modulation.

The low-pass filter 23 also passes noise over its entire 0–20 kc. p. s. band. Its output is applied through audio amplifier 24 and a transformer 61, Fig. 1, to a band-pass filter 60 consisting of inductance 62, capacitance 63 and resistance 64. The band-pass filter 60 is tuned to a midband frequency of 4 kc. p. s. and has a bandwidth of 400 c. p. s. or 10% of its midband frequency. It thus passes a spectrum of frequencies including the 4 kc. p. s. modulating frequency and some noise, this spectrum simulating generally the characteristic of the audio signal containing the Doppler frequency at the output of the audio amplifier 24 in the actual use of the radar transmitter-receiver.

The output of the 4 kc. p. s. band-pass filter 60 is applied to the input control grid 66 of a two-stage amplifier comprising triodes 67 and 68. Negative feedback from anode 69 to cathode 71 is controlled by a rheostat 72, providing gain control.

The amplifier output is coupled through condenser 73 to an averaging diode detector 74 and the resulting rectified potential is applied to a voltmeter comprising indicating instrument 76, multiplying resistors 77, 78 and 79 and smoothing condenser 81. Resistor 79 is adjustable to correct the zero setting for the tube cathode potential. The voltage indicator 76 thus indicates the time-average and the frequency-average of the output of the band-pass filter over its band.

Operation of this test circuit as shown in Fig. 1 to indicate receiver sensitivity in terms of noise is as follows:

With klystron oscillator 50 inoperative, the adjustment of rheostat 72 is changed until the voltmeter 76 indicates 50% of full scale reading, being actuated solely by the noise output signal. This reading corresponds to a S/N ratio of zero and therefore a signal magnitude referred to noise of minus infinity db. Next the klystron 50 is turned on, its output being modulated by the 50 kc. p. s. sawtooth and the 4 kc. p. s. sinusoidal wave as described, and its output is increased by use of attenuator 28 until the voltmeter 76 indication is 72.3% of full scale. It may be shown by a theoretical analysis that this reading indicates a signal equal to noise in magnitude, or that $S/N=1$. This is equivalent to a signal strength referred to noise of zero db. Keeping the adjustments the same, different receivers may now be compared by interchanging and the amount of change of the klystron input to keep the output indication constant is a measure of the comparative sensitivity of the receivers.

An additional step may be taken by increasing the klystron output until the voltmeter 76 indicates 90.6% of full scale, which may be shown by analysis to represent a S/N ratio of 1.41 and a signal referred to the noise level of 3 db. This step is of value in indicating the capability of the receiver to pass a signal of this magnitude.

What is claimed is:

1. An instrument for testing a pulsed Doppler radio transmitter-receiver comprising, means for generating a microwave test signal, sawtooth generator means for sweeping said microwave test signal past the frequency band to which the receiver of said pulsed Doppler transmitter-receiver is tuned, whereby said test signal is introduced to the receiver, means for triggering said sawtooth generator means synchronously and in phase with the pulses of said Doppler radio transmitter receiver, means for modulating said sawtooth generator means at a rate in the Doppler band, and indicating means energized by the output signals derived from said receiver.

2. An instrument for testing a pulsed microwave Doppler radio containing a transmitter and a receiver comprising, a sawtooth generator, means for triggering said sawtooth generator synchronously and in phase with the pulses generated by said transmitter, means for modulating said sawtooth generator at a selected frequency in the Doppler frequency range to produce a modulated signal, a microwave generator, means for frequency modulating said microwave generator by said modulated signal, means for applying the output of said microwave generator to said receiver, means for restricting the output energy of said receiver to a selected bandwidth representative of a Doppler spectrum bandwidth, and averaging means for indicating an amplitude representative of the time average and the frequency average of the energy output of said last-named means.

3. An instrument for testing a pulsed microwave Doppler radio having a transmitter and receiver comprising, a sawtooth generator, means connecting said sawtooth generator to said transmitter for securing pulses therefrom at the pulse repetition frequency and phase thereof for triggering the sawtooth generator, an oscillator for emitting alternating energy at a frequency within the Doppler band of frequencies, means for amplitude modulating said sawtooth generator by said oscillator energy output, a microwave generator, means connecting said sawtooth generator to said microwave generator for the frequency modulation of the output thereof, means for applying the output of said microwave generator to the input of said receiver, a band-pass filter connected to the output of said receiver for restricting its output frequency band, an averaging detector connected to the output terminals of said band-pass filter, and a direct-current indicator connected to the output terminals of said averaging detector.

4. An instrument for testing a pulsed microwave Doppler radio having a transmitter and receiver comprising, a sawtooth generator, means applying pulses at the transmitter pulse repetition frequency and phase to trigger said sawtooth generator, an oscillator emitting alternating energy at a selected frequency within the Doppler band and less than said pulse repetition frequency, means for amplitude modulating said sawtooth generator by said alternating energy thereby producing a sawtooth wave of cyclically varying height and slope, a microwave generator, means for frequency modulating the microwave output of said generator by said sawtooth wave of cyclically varying height and slope, means applying said microwave output to said receiver whereby the input energy is swept through the frequency pass band of said receiver at the pulse repetition frequency thereby producing a pulse width modulated output, a low-pass filter in said receiver for removing the pulse repetition frequency whereby the width modulated pulse output is converted to amplitude modulated output at said selected frequency within the Doppler band, a band-pass filter centered at said selected frequency and having a bandwidth representing the desired Doppler and noise bandwidth to be simulated, said band-pass filter being connected to the output of said receiver, an averaging detector connected to said band-pass filter, and a voltage indicator connected to said averaging detector whereby the average demodulated voltage magnitude of the signal and noise output of said band-pass filter is indicated.

References Cited in the file of this patent

UNITED STATES PATENTS

| | | |
|---|---|---|
| 2,455,996 | Harvey | Dec. 14, 1948 |
| 2,500,325 | Sanders | Mar. 14, 1950 |
| 2,622,241 | Keizer | Dec. 16, 1952 |
| 2,714,206 | Blitz | July 26, 1955 |